United States Patent [19]

Smith et al.

[11] Patent Number: 5,452,612
[45] Date of Patent: Sep. 26, 1995

[54] MULTI-MODE ACCELEROMETER

[75] Inventors: Peter R. Smith, Folsom, Calif.; John C. Henry, Paoli, Pa.

[73] Assignee: The Whitaker Corporation, Wilmington, Del.

[21] Appl. No.: 159,350

[22] Filed: Nov. 30, 1993

Related U.S. Application Data

[63] Continuation of Ser. No. 952,345, Sep. 28, 1992, abandoned, and a continuation-in-part of Ser. No. 812,603, Dec. 23, 1991, abandoned.

[51] Int. Cl.⁶ .................................................. G01P 15/09
[52] U.S. Cl. .......................... 73/514.34; 360/60; 310/330; 310/366
[58] Field of Search ............................. 73/517 R, 517 A, 73/517 AV; 310/328, 329, 330, 338, 366; 360/60; 369/33

[56] References Cited

U.S. PATENT DOCUMENTS

| | | |
|---|---|---|
| 2,716,893 | 9/1955 | Birdsall . |
| 3,304,787 | 2/1967 | Chiku et al. ............... 73/517 R |
| 3,363,471 | 1/1968 | Lovelace ................... 73/517 R |
| 3,842,681 | 10/1974 | Mumme ..................... 73/505 |
| 4,038,876 | 8/1977 | Morris ........................ 73/1 E |
| 4,121,272 | 10/1978 | Wolfinger .................. 361/236 |
| 4,413,202 | 11/1983 | Krempl et al. ............ 310/338 |
| 4,430,895 | 2/1984 | Colton ....................... 73/517 R |
| 4,431,935 | 2/1984 | Rider ......................... 310/331 |
| 4,457,173 | 7/1984 | Hunter ....................... 73/510 |
| 4,660,410 | 4/1987 | Asano ........................ 73/35 |
| 4,672,180 | 6/1987 | Kusunoki ................... 214/494 |
| 4,672,915 | 6/1987 | Jenkins ...................... 118/124 |
| 4,689,992 | 9/1987 | Strachan .................... 73/505 |
| 4,692,915 | 9/1987 | Moriya et al. ............. 369/53 |
| 4,720,682 | 1/1988 | Ikushima et al. ......... 324/458 |
| 4,730,511 | 3/1988 | Tsujimura .................. 74/567 |
| 4,831,476 | 5/1989 | Branc et al. ............... 360/97.02 |
| 4,862,298 | 8/1989 | Genheimer et al. ...... 360/60 |
| 4,868,566 | 9/1989 | Strobel et al. ............ 340/870.3 |
| 4,870,868 | 10/1989 | Gastgeb ..................... 73/649 |
| 4,932,259 | 6/1990 | Ueno .......................... 73/517 AV |
| 4,937,806 | 6/1990 | Babson et al. ............ 369/75.1 |
| 4,996,878 | 3/1991 | Kubler ....................... 73/510 |
| 5,001,933 | 3/1991 | Brand ........................ 73/651 |
| 5,003,824 | 4/1991 | Fukada et al. ............ 73/517 R |
| 5,009,106 | 4/1991 | Kubler ....................... 73/651 |
| 5,045,745 | 9/1991 | Umemoto et al. ........ 310/329 |
| 5,128,581 | 7/1992 | Nakayama et al. ....... 310/329 |
| 5,235,472 | 8/1993 | Smith ......................... 360/60 |

FOREIGN PATENT DOCUMENTS

| | | |
|---|---|---|
| 0325674 | 8/1989 | European Pat. Off. . |
| 747008 | 1/1944 | Germany . |
| 2316130 | 10/1974 | Germany . |
| 9017712 | 11/1991 | Germany . |
| 3-242557 | 10/1991 | Japan . |
| 3-242555 | 10/1991 | Japan . |
| 3-242556 | 10/1991 | Japan . |
| 3-259750 | 11/1991 | Japan . |
| 420865 | of 1992 | Japan . |
| 1601547 | 10/1981 | United Kingdom . |

OTHER PUBLICATIONS

Search Report, PCT/US92/11207, corresponding to present application, Mar. 24, 1993.
Search Report, EP 93 902 753.8, corresponding to present application, Mar. 31, 1994.
Acceleration Feedforward Control For Head Positioning In Magnetic Disk Drives; K. Aruga, Y. Mizoshita, M. Iwatsubo, T. Hatagami; Fujitsu Laboratories Ltd., pp. 19–24, no date.

*Primary Examiner*—Hezron E. Williams
*Assistant Examiner*—Michael J. Brock

[57] ABSTRACT

An accelerometer has a piezoelectric transducer which produces electrical signals in response to its deflection and comprises an elongated, continuous beam of generally flat configuration and narrow cross section to provide a bending axis which facilitates deflection of the free ends in response to shock in either or both of the linear and torsional modes. The beam is supported intermediate its ends by a mount, with the free ends of the beam preferably extending equidistantly in opposite directions from the mount so that the free ends of the beam deflect in the same direction in response to shock in the linear mode, e.g., along the X axis, and they deflect in opposite directions in response to shock in the torsional mode, i.e., about the Z axis.

15 Claims, 4 Drawing Sheets

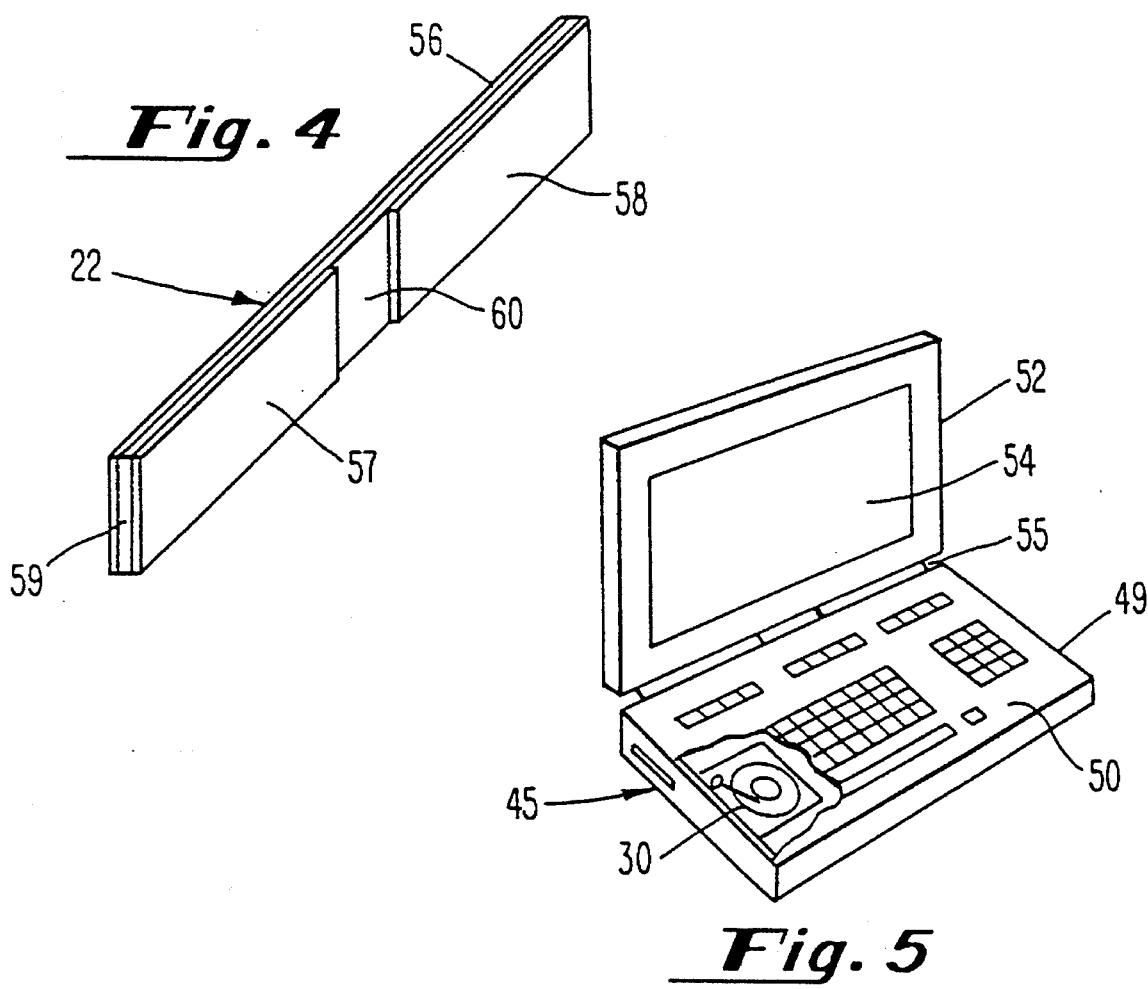
Fig. 4
Fig. 5
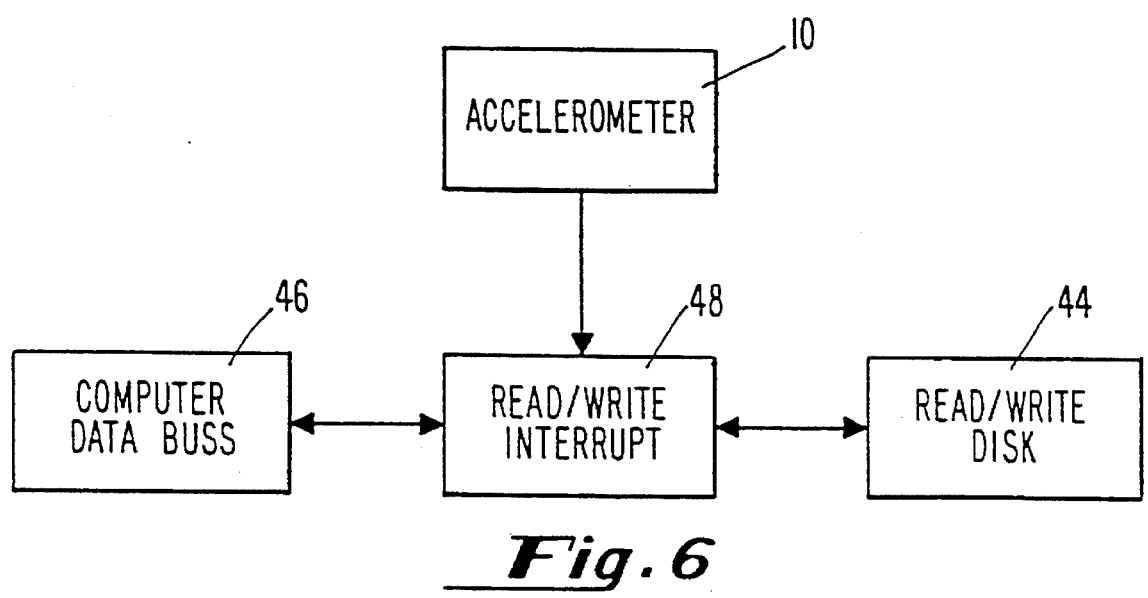
Fig. 6

MULTI-MODE ACCELEROMETER

RELATED APPLICATIONS

This application is a continuation of U.S. Ser. No. 07/952,345 filed Sep. 28, 1992, now abandoned, and a continuation-in-part of U.S. Ser. No. 07/812,603 filed Dec. 23, 1991, now abandoned.

BACKGROUND OF THE INVENTION

The present invention relates to a miniature, beam-type multi-mode accelerometer. Accelerometers of this kind respond to shock in several different directions. The present invention is especially useful on disk drives of notebook-size computers, and on other shock-sensitive, portable or hand-held equipment.

The present invention is directed to increasing the sensitivity, accuracy and compactness of such an accelerometer, and is further directed to reducing the cost of its manufacture.

The multi-mode accelerometer described herein operates in one or more linear modes along X and Z axes which are orthogonally disposed, i.e., in a common plane at right angles to one another, and also in an angular or torsional mode about the Z axis. The present accelerometer is operable in one or several of such modes.

Notebook size computers employ small-diameter hard disk drives for data storage, that is, the information is magnetically stored on closely spaced tracks of rotatable discs. In the event that the disk drive experiences shock during the read/write operation, an improper read or write to the disk may take place; and an accelerometer is employed to detect the shock and initiate a response. A multi-mode accelerometer constructed according to the present invention initiates an interruption of the read/write operation in response to shock above a predetermined level in one or more of the modes previously described. In addition, the accelerometer signal may be used in a feedback loop to control the position of the read/write arm, such as to reverse or otherwise reposition the arm in the event of shock. Furthermore, the accuracy, dependability, low cost, and thumbnail size of the accelerometer herein-described is well suited for advanced hard drive and notebook-size computer apparatus.

Although a multi-mode accelerometer is disclosed herein, it may be configured advantageously to respond solely to torsional mode acceleration. Such a single mode accelerometer will be less expensive to manufacture, and the complexity and cost of electrical interfacing will also be reduced.

The construction of the disc drive shown and described in U.S. Pat. No. 4,831,476, issued May 16, 1989 to P. J. Pisczak, is incorporated herein by reference for the sake of brevity in disclosing apparatus of the type with which the present invention is operatively associated and has its principal utility.

PRIOR ART ACCELEROMETERS

The present invention is an improvement upon the accelerometers and transducers disclosed in U.S. Pat. No. 4,996,878 of John Kubler issued on Mar. 5, 1991, and also U.S. Pat. No. 4,431,935 which issued Feb. 14, 1984 in the name of B. F. Rider.

The Kubler transducer employs two identical oscillating beams of piezoelectric material, separated electrically, and fixed by their respective mountings to a base. Electrical contacts are attached to the upper and lower side of each beam; and attached to the contacts are lines interconnecting the piezoelectrical elements, or signal lines which take off the signals generated. The two identical beams have unmatched electrical characteristics which, in actual practice, require compensating circuitry and adjustment.

The Rider sensor structure is mounted on the object being monitored for rotation therewith, and it comprises a plurality of plates preferably arranged in a laminated structure.

SUMMARY OF THE INVENTION

The present invention seeks to avoid the deficiencies of Kubler's two oscillating beams that are electrically unmatched. It also seeks to avoid the deficiencies of Rider's multiple transducers laminated together in view of their unpredictable electrical characteristic, or in mounting such a transducer on an object for rotation therewith. Rather, the present construction uniquely employs one, centrally mounted piezoelectric beam with a unitary, full length, common conductor on one surface of the piezoelectric member providing a multi-mode accelerometer, one which is capable of performing electrical differencing by itself, and which serves as a linear and angular accelerometer.

Since the accelerometer of the present invention utilizes a simple, continuous, piezoelectric beam as the active element of the sensor, the deflecting portions are well matched, surely better matched than two separate beams; and therefore the present accelerometer does not require the matching or compensating circuitry of prior art accelerometers.

The sensor of the present invention includes a housing for the sensor, and its mount is secured in stationary position on that housing. Unlike the Rider construction, the present housing is mounted, not for rotation with a rotating object, but it is fixedly mounted on a non-rotating object for monitoring the acceleration of that object in both linear and torsional modes.

According to the present invention, an accelerometer is provided with a miniature, beam-type sensor which is responsive to shock in a first linear mode along an X axis, and in a torsional mode about a Z axis that is perpendicular to the X axis. The sensor, a piezoelectric transducer which produces electrical signals in response to its deflection, is an elongated beam which extends longitudinally in a direction perpendicular to the X and Z axes. Although the invention is not so limited, the beam is of generally flat configuration and narrow cross section to provide a bending axis which facilitates deflection of the free ends in the desired direction in response to shock in either or both of the linear and torsional modes.

The beam is supported intermediate its ends by a mount, with the free ends of the beam preferably extending equidistantly in opposite directions from the mount. The free ends of the beam deflect in the same direction in response to shock in the linear mode, e.g., along the X axis, and they deflect in opposite directions in response to shock in the torsional mode, i.e., about the Z axis.

A beam of polymer material does not require electrical insulation. In addition, flexible polymer material is well suited for use as a beam subject to bending forces, and also in service as a device which deflects under such bending forces when measuring acceleration.

The beam is made of piezoelectric material and has a pair of output electrodes on one side thereof. A unique common conductor is also provided on the other side thereof by a continuous, unitary, electrically conductive member extending the entire length of the beam. The mount has conductive elements or fingers engaging the respective output electrodes and common conductor to provide electrical contact therewith and leads therefrom. In addition, the conductive elements or fingers of the mount engage and clasp the beam on opposite sides thereof to hold it securely in position.

The present sensor is preferably mounted on a casing of a hard disk drive or other non-rotatable surface of a portable computer. The computer has a data buss and a read/write disk for magnetic data storage. The sensor circuitry includes a read/write interrupt device operatively associated with a data buss and a read/write disk. Upon receipt of signals at a predetermined level from the sensor, the interrupt device interrupts the transfer of data between the data buss and the read/write disk, with the result that read/write errors caused by shock to the computer are prevented. Alternatively, as previously noted, the signal may be employed to reverse or otherwise reposition the arm in the event of shock.

The sensor of the present invention may be an oscillating beam made from piezoelectric polymer sheet material that has metalized film deposits on both sides, the deposit on one side being of uniform thickness over its entire length, or a laminated strip of beryllium copper material is preferred instead as the common conductor. Output electrodes are formed on the opposite surface of the sheet material, preferably as spaced-apart deposits of electrically conductive material.

The beam produces signals with voltage potential proportional to linear acceleration in response to shock in the direction of the X axis, and the beam produces signals with voltage potential proportional to angular acceleration in response to torsional shock about said Z axis.

If the longitudinal axis of the sensor remains in a plane containing the X axis and the sensor is rotated on its longitudinal axis to a position where its sides are at a 45 degree inclination to that plane, the Z axis remaining normal to that plane, linear acceleration in the direction of the Z axis will be detected and measured as well as linear acceleration along the X axis and rotational acceleration about the Z axis.

BRIEF DESCRIPTION OF THE DRAWINGS

FIG. 4 is an enlarged perspective view of a transducer element employed in the accelerometer of FIG. 1.

FIG. 5 is a perspective view of a notebook size portable computer employing the invention, with a portion of the computer casing broken away to show an internally positioned hard disk drive unit embodying the invention.

FIG. 6 is a block diagram showing the functional relationship of the accelerometer to the computer data buss, the magnetic storage media, and the read/write interrupt device.

DETAILED DESCRIPTION OF THE PREFERRED EMBODIMENT

Figure 1:
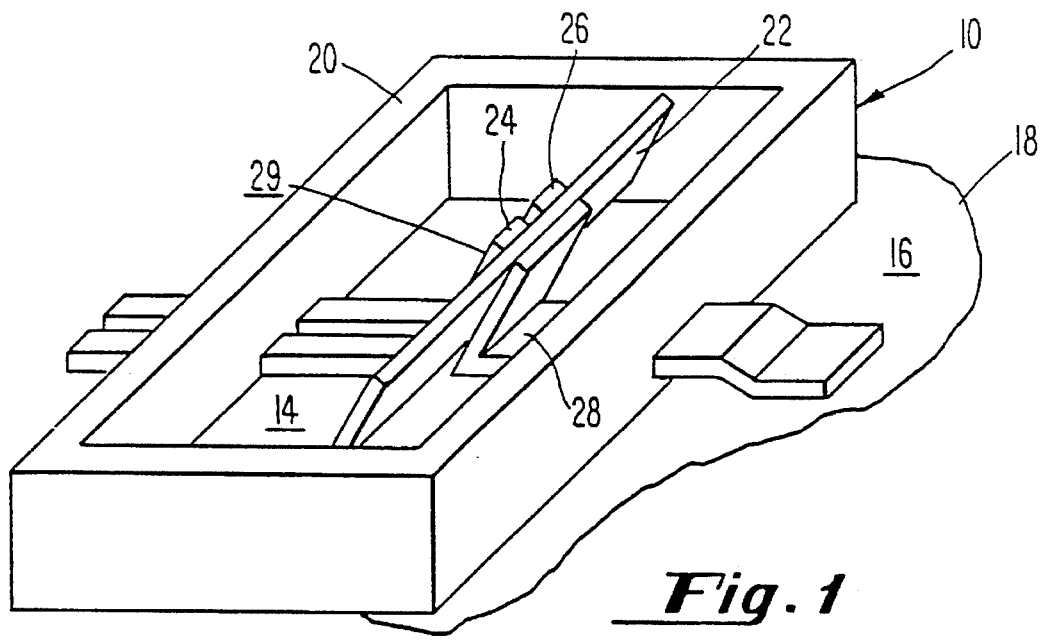
FIG. 1 is an enlarged perspective view of an accelerometer embodying the invention, its casing mounted on the surface of an object being monitored, and the cover of its casing removed to provide a view of the interior.
Figure 3:
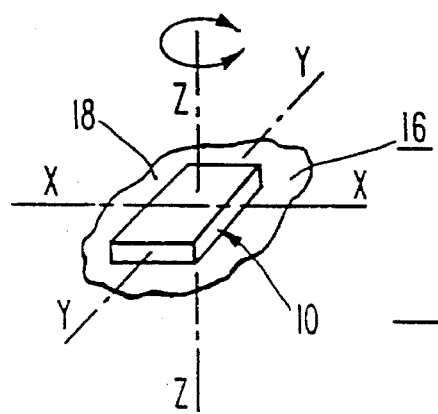
FIG. 3 is a perspective view of an accelerometer showing the X and Z axes in broken lines, and with arrows indicating the torsional mode.

Shown in FIG. 1 of the drawings is a miniature, multi-mode accelerometer 10 embodying the invention. The accelerometer 10 is housed by a case 12 having a base 14 rigidly secured to the surface 16 of an object 18. A cover for the case 12 is removed and not shown in FIG. 1, but it is in place in FIG. 3.

It is the function of the accelerometer 10 to respond to shock, such as to detect or measure the acceleration of the object 18. The accelerometer 10 responds in one or both linear modes along orthogonal X and Z axes shown in FIG. 3, and torsionally about the Z axis as indicated by the arrows in FIG. 3. The accelerometer 10 includes electronic circuitry which is described hereinafter with reference to FIGS. 7 to 9.

The case 12 further includes upright wall structure 20 surrounding an elongated transducer element 22. The element 22 is securely gripped and supported above the base 14 between a pair of fingers serving as conductive elements 24, 26 on one side of the element and another finger 28 serving as third conductive element on the other side thereof. The fingers 24, 26, 28 comprise a mount 29. An effective electrical connection is also made by the force of engagement between the mutually facing contact surfaces as a result of wedging the element 22 between the finger 28 and the pair of fingers 24, 26.

Figure 2:
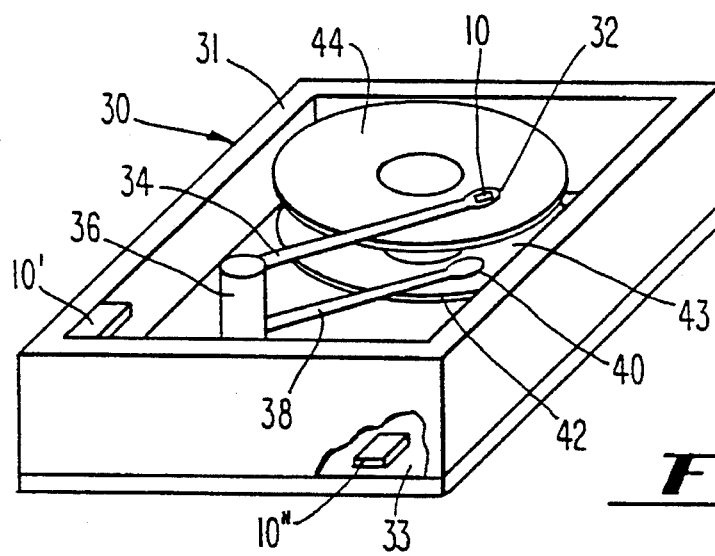
FIG. 2 is a perspective view of a disk drive unit having the accelerometer of the present invention mounted on a read/write head, shown with its cover removed and with a portion of the housing broken away.

When applied to a hard disc drive 30 as shown in FIG. 2, the accelerometer 10 including its case 12 is affixed to a read/write head 32 which corresponds to the object 18 in FIG. 1. Alternatively, the accelerometer designated 10' may be rigidly mounted on the housing 3' of the drive 30 as shown in FIG. 2, or the accelerometer designated 10" may be affixed to the circuit board 33 within housing 31, also as shown in FIG. 2.

The read/write head 32 is installed at the free end of a read/write arm 34, movable in a limited arcuate range about an upright arm-positioning shaft 36. Also attached to the same shaft 36 is a locating arm 38 on the end of which is a position detector 40. Detector 40 cooperates with locating disk 42 at its locating surface 43 to signal the track and sector position of the read/write head 32 relative to the read/write discs 44. The accelerometer 10 is installed on head 32 for maximum responsiveness to head movement in a hard disk drive.

The risk of read/write error due to shock increases with the downsizing of hard disk drives to fit into notebook-size computers. Mild shocks which previously could be tolerated now produce movement of the read/write head off the proper track to and beyond the adjacent track. This is because downsizing has reduced the distance between adjacent tracks of the disk, i.e., the magnetic storage media. It follows that the risk of read/write error due to shock in portable computers is exacerbated by downsizing of the disk, and the present invention addresses that concern.

Referring now to FIG. 6, the hard disk drive 30 is installed in a notebook-size portable computer 45. The accelerometer 10 is there operatively associated with the hard disk drive 30 in accordance with the diagram of FIG. 5. Data flows from computer buss 46 to magnetic storage media provided by read/write discs 44 under control of an electronic read/write interrupt device 48. In response to a signal from the accelerometer 10, the interrupt device 48 either allows or interrupts the flow of data between the buss 46 and the disc storage media 44, in either direction, or as previously noted the signal may be used in a feedback loop to control repositioning of the head 32.

As previously indicated, this mounting location is most sensitive in computer 45 for interruption of the read/write operation during shock to prevent read/write error. As shown in FIG. 5, the computer 45 includes a case 49 with keyboard 50, video monitor 52 with screen 54, and hinge structure 55. A hard disk drive 30 having an accelerometer 10 is mounted in the case 49.

As shown in FIG. 4, the beam-type accelerometer 10 is provided with a single piezoelectric transducer element 22. This element 22 preferably comprises a thin, elongated strip of beryllium copper providing the common conductor 56 laminated with adhesive to a single, similarly shaped sheet 59 of polarized polymeric piezoelectric material, preferably polyvinylidene fluoride (PVDF). As an alternative to sheet 59, a layer of polarized piezoelectric material such as $VF_2VF_3$ may be cast against the common conductor 56. The PVDF sheet 59 is procured with piezoelectric properties because in its manufacture it was stretched and subjected at elevated temperature to a large electric field to induce permanent piezoelectric activity.

As an alternative to a laminate of the PVDF sheet 59 and beryllium copper common conductor 56 as shown in FIG. 4, a metallic deposit of conductive material on a thicker and therefore stiffer sheet 59 of PVDF material may be substituted. Preferably the deposited material forming conductor 56 is nickel, although silver, aluminum, gold and carbon are among other suitable materials.

Midway between the ends of the PVDF sheet 59, on the side opposite the common conductor 56, as shown in FIG. 4, is an uncoated area 60 of sheet 59 which extends across the entire width of the element 22. On the same side as the uncoated area 60, and covering the remainder of this surface are metallic deposits serving as the output electrodes 57, 58. Each electrode 57, 58 extends from the uncoated area 60 to the associated free end of the transducer element 22.

Figure 7:
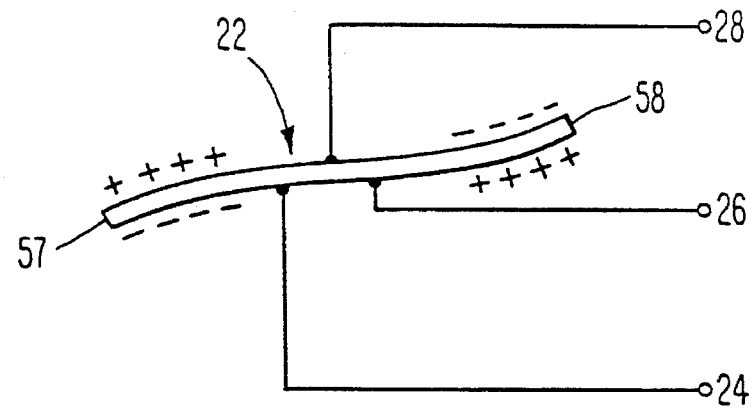
FIG. 7 is a schematic view of the transducer and its electrical circuitry, showing deflection and polarity of the transducer in the torsional mode.
Figure 8:
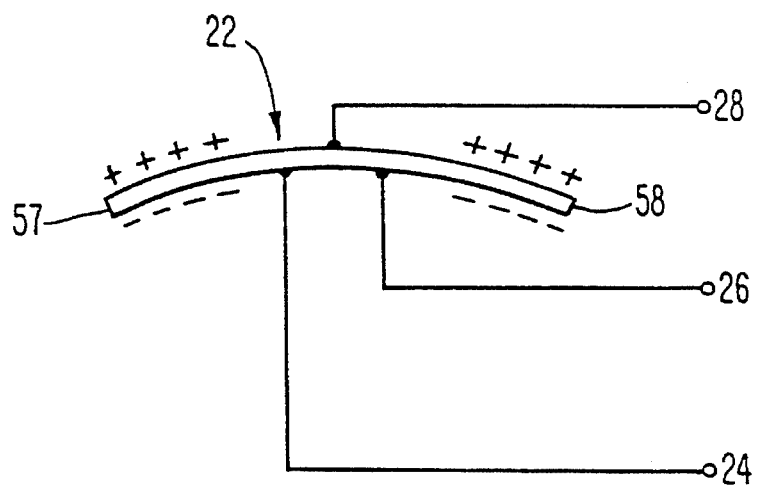
FIG. 8 is a schematic view of the transducer and its electrical circuitry, showing deflection and polarity of the transducer in the linear mode.

Fixedly supporting the transducer element 22 at a point intermediate its ends is the mount 29 whose conductive elements or fingers 24, 26 respectively contact the output electrodes 57, 58, and whose conductive element or finger 28 contacts the common conductor 56, as shown in FIG. 1. Thus supported by mount 29, the free ends of the beam defined by transducer element 22 extend equidistantly in opposite directions from the mount 29. The free ends of the beam deflect in the same direction, as shown in FIG. 8, in response to shock in the linear mode along the X or Z axis; and they deflect in opposite directions, as shown in FIG. 7, in response to shock in the torsional mode about the Z axis.

The mount 29 employs the conductive elements or fingers 24, 26 and conductor 28 not only for making electrical contact or engagement with opposite sides of the transducer element 22, but also to clasp the transducer element 22 when engaging it on opposite sides thereof. Thus, two of said conductive elements of said mount 29, i.e., the fingers 24, 26, engage and provide leads to the output electrodes 57, 58, and the third of said conductive elements or fingers 28 engages and provides a lead to the common conductor 56.

With the transducer element 22 inclined at an angle of 45 degrees to the base 14 of the casing 12 and the underlying surface 18 of the object 10 on which it is mounted, the accelerometer 10 responds to linear shock in a plane containing the X axis, which plane is parallel to the surface of the base 14 of casing 12, and to the surface 18 of the object 16 being monitored. The accelerometer also responds to linear shock in the direction of the Z axis which is perpendicular to the X axis and preferably normal to the surface 18 and the base 14. An accelerometer of this construction is virtually insensitive to linear shock along the longitudinal axis of the transducer element 22 and sensitive to shock transverse to the longitudinal extent of the transducer element 22. It is also most sensitive in the torsional mode where the cross section of the element 22 offers the least resistance to bending. Although the Z axis is shown normal to the surface 18 in FIG. 3, it will be most sensitive at the angle of inclination of the element 22.

The construction and arrangement is such that in response to linear acceleration there is common mode rejection because the two ends of the element 22 vibrate in unison, that is, both ends deflect in the same direction and produce the same voltage of the same polarity to the output electrodes 57, 58. On the other hand, in torsional mode the ends of the transducer element 22 move in opposite directions, out of phase, producing the same voltage of opposite polarity to the output electrodes 57, 58.

If output voltages are measured for the deflection conditions shown in FIG. 7, it can be seen that a net potential difference in voltage $V_{24}-V_{26}$ is obtained in the torsional mode. However, under the conditions of FIG. 8, in the linear deflection mode, a potential in voltage $V_{24}-V_{26}$ does not exist because the terminals are at the same potential. Thus, a voltage $V_{24}-V_{26}$ is obtained only when torsional deflection occurs as shown in FIG. 7.

In the case of either linear or torsional deflection, voltage potentials exist at $V_{26}-V_{28}$, $V_{24}-V_{26}$, and $V_{24}-V_{28}$ in proportion to deflection, and these values are useful for determining displacement, velocity and acceleration.

Figure 9:
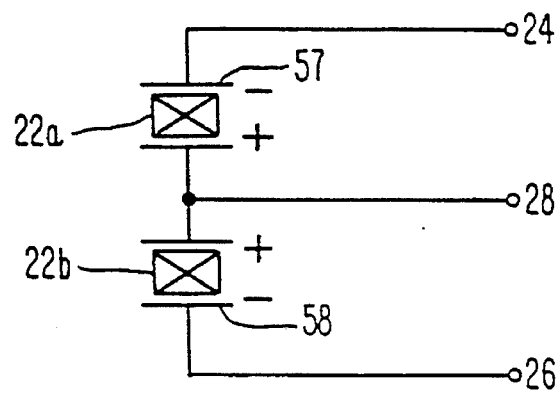
FIG. 9 is an equivalent electrical circuit of the transducer element of FIG. 4 when installed as in FIG. 1.

The equivalent circuit of FIG. 9 shows the now well known parts of FIGS. 7 and 8, except that the transducer element 22 is designated $22_a$ and $22_b$ for the parts thereof at the two free ends, with their polarities as indicated.

MODIFICATIONS

Although a polymeric material is preferred for the element 22, a ceramic piezoelectric material may be employed for specific embodiments of the invention.

As another possible variation, although casting of the piezoelectric layer onto conductor 56 is desired, this may be accomplished by laminating the layer onto the conductor.

The elongated transducer element 22 is desirably constructed with all non-conductive materials on its exposed surfaces, thus providing a beam movable in the bending mode having an exterior which is non-conductive.

The invention has been shown in FIG. 1 with the element 22 mounted at a 45 degree angle to the base 14 of the casing 12, and at 45 degrees to the surface 18 of the object 10 whose acceleration is being measured. In this context, it is the width or transverse extent of the long, flat element 22 that is so mounted. It is to be understood, however, that the element 22 may be mounted parallel to the base 14 and surface 18, or optionally at a right angle to the base 14 and surface 18. In these alternative mounted positions, the element 22 is most sensitive when bending about its narrowest cross section; therefore, the accelerometer of the present invention is well suited for use as a single mode, e.g., torsional mode, accelerometer when alternatively mounted as described.

Figure 10:
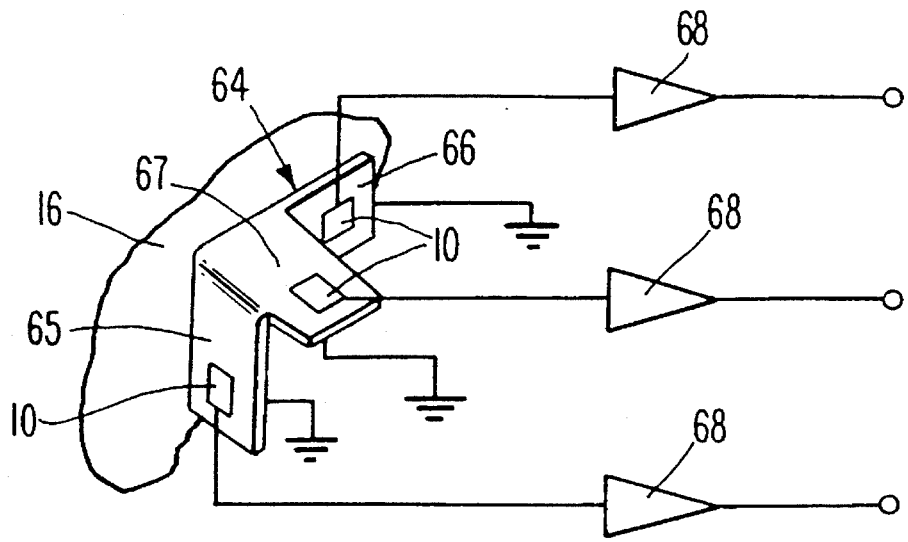
FIG. 10 is a view, partly perspective showing a three-axis mount for a multi-mode accelerometer, and partly schematic to show associated electronic circuitry for the accelerometers.

A still further modification of the present invention will utilize three single-mode accelerometers 10 respectively mounted on object surface 16, as shown in FIG. 10, by means of mount 16. Mount 16 has three surfaces 62, 64, 66 which are respectively oriented orthogonally relative to the X, Y and Z axes. The three accelerometers 10 are independently mounted on the respective surfaces 62, 64, 66 for measuring acceleration; each is equipped to measure acceleration in a selected mode and is operatively associated with an amplifier 68 and an amplifying circuit for the signal generated. The mode selected for measurement is likely to be torsional but it may measure in linear mode as well or instead. Whether used to measure one or more modes of acceleration on each of the three surfaces of mount 61, the three accelerometers 10, used in combination, comprise a multi-mode accelerometer.

Figure 11:
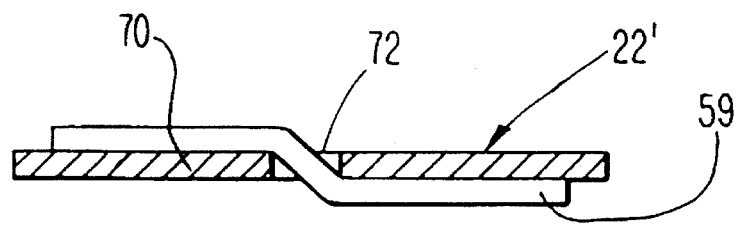
FIG. 11 is a longitudinal cross-sectional view of a modified transducer.

Shown in FIG. 11 and designated 22' is a variation of the element 22 shown in FIG. 4. The element 22' of FIG. 11 includes a strip 59 of metalized, piezoelectric polymer material, carried by a non-conductive beam 70. The beam 70 has a central notch, hole or through opening 72 whereby one end of the strip 59 is on one end at one side of the beam 70, and extends through the opening 72 to extend to the other end at the other side of the beam 70. Adhesive or laminating processes may be employed to secure together broad surfaces of the strip 59 and beam 70. The beam 70 may be non-conductive throughout or of conductive material with a non-conductive coating.

Figure 12:
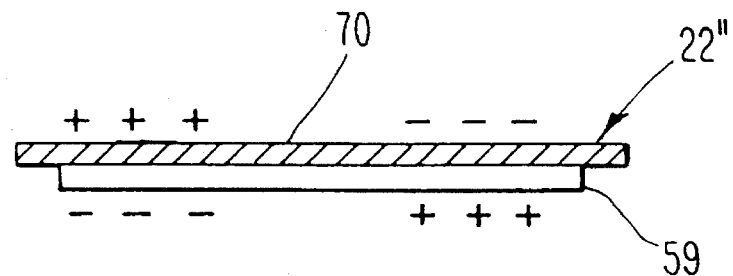
FIG. 12 is a longitudinal cross-sectional view of another modified transducer.

Shown in FIG. 12 and designated 22" is still another variation of element 22 having a beam 70 which is adhesively secured or laminated to one side of the metalized, piezoelectric polymer strip 59. Here, however, the opposite end portions of the strip 59 are oppositely spot-poled. More particularly, the element 22" of the beam structure includes a transducer strip 59 of continuous piezoelectric material poled at one end thereof with positive polarity along one side thereof and negative polarity on the opposite side thereof, and poled at the other end thereof with negative polarity along one side thereof and positive polarity on the opposite side thereof.

The above invention may be practiced with various modifications which will readily occur to those skilled in the art, without departing from the claims which follow.

What is claimed is:

1. A sensor for an accelerometer responsive to shock in a first linear mode along an X axis, and in a torsional mode about a Z axis perpendicular to said X axis, said sensor comprising:

a) an elongated beam structure extending longitudinally in a direction perpendicular to said X and Z axes, said beam structure comprising a piezoelectric transducer which produces electrical signals in response to its deflection, b) a mount fixedly supporting said beam structure at a point intermediate its ends, the free ends of said beam structure extending equidistantly in opposite directions from said mount, said free ends of said beam structure deflecting in the same direction in response to shock in said first linear mode and deflecting in opposite directions in response to shock in said torsional mode, c) said beam structure comprising a piezoelectric material and having a pair of output electrodes on one side thereof, and a continuous, electrically conductive member extending along the length of said beam structure on the other side thereof providing a common conductor, said common conductor extending on both sides of the mount, d) said mount including conductive elements for the respective output electrodes and common conductor in electrical contact therewith, said conductive elements engaging said beam structure on opposite sides thereof, e) whereby different signals are produced in response to linear acceleration and torsional acceleration.

2. A sensor as in claim 1 wherein the beam structure is of generally flat configuration and narrow cross section to facilitate deflection of the free ends in response to shock in said linear and torsional modes.

3. A sensor as in claim 2 wherein said X axis is in a plane normal to said Z axis, wherein the respective said sides of said beam structure are at an acute angular inclination to said plane, whereby said beam structure is also responsive to shock in a linear mode along said Z axis.

4. A sensor as in claim 1 wherein said conductive elements are fingers clasping said beam structure when engaging the said opposite sides thereof.

5. A sensor as in claim 1, wherein said sensor is within a housing and said mount is secured in stationary position on said housing, said housing being fixedly mountable on a non-rotating object exposed to shock for monitoring the acceleration of said object in said linear and torsional modes.

6. A sensor as in claim 1 wherein said piezoelectric material is a polymer material.

7. A sensor as in claim 1 wherein the electrically conductive member comprises beryllium copper material.

8. A sensor as in claim 7 wherein the electrically conductive member and piezoelectric polymer material comprise a laminate, and said output electrodes on said one side of said beam structure are formed at both opposite end portions thereof by spaced-apart depositions of electrically conductive material on one surface of said laminate.

9. A sensor as in claim 8 wherein there are two conductive elements on said mount to engage and provide leads to said output electrodes, and a third conductive element to engage and provide a lead to said common conductor.

10. A sensor according to claim 1 wherein said mount comprises three orthogonally oriented mounting surfaces for the respective X, Y and Z axes, and wherein there are three beam structures, each comprising an element of continuous piezoelectric polymer material mounted at a point intermediate its ends on one of the respective mounting surfaces.

11. A sensor for an accelerometer responsive to shock in a first linear mode along an X axis, and in a torsional mode about a Z axis perpendicular to said X axis, said sensor comprising:

a) an elongated beam structure extending longitudinally in a direction perpendicular to said X and Z axes, said beam structure comprising a piezoelectric transducer which produces electrical signals proportional to its deflection, b) a mount supporting said beam structure intermediate its ends, the free ends of said beam structure extending in opposite directions from said mount, said free ends of said beam structure deflecting in the same direction in response to shock in said first linear mode and deflecting in opposite directions in response to shock in said torsional mode, c) said beam structure comprising a piezoelectric polymer material, one side thereof having spaced-apart deposits of electrically conductive material at its end portions providing a pair of output electrodes, and the other side thereof having on its surface for the length thereof a continuous layer of conductive material providing a common conductor, d) said mount comprising conductive elements engaging the respective electrodes and common conductor to provide electrical leads thereto and for securely clasping said beam structure, e) said beam structure producing signals with voltage potential proportional to linear acceleration in response to shock in the direction of the X axis, and producing signals with voltage potential proportional to angular acceleration in response to torsional shock about said Z axis, f) whereby different signals are produced in response to linear acceleration and torsional acceleration.

12. A sensor in accordance with claim 11 wherein the piezoelectric polymer material comprises a piezoelectric polymer sheet material.

13. An accelerometer sensor comprising:

a) an elongated beam structure comprising a central portion disposed between two outboard portions, said beam structure comprising a piezoelectric transducer which produces electrical signals in response to deflection, said transducer extending across the central portion into both outboard portions;

b) said beam structure comprising a pair of output electrodes on one side thereof, and a continuous, common conductor on the other side thereof, said output electrodes each positioned on a respective one of the outboard portions, said common conductor extending across the central portion into both outboard portions;

c) a mount comprising first, second and third conductive elements, said first and second conductive elements in electrical contact with the respective output electrodes at said one side of the beam structure, said third conductive element in electrical contact with the common conductor at said other side of the beam structure, opposite said first and second conductive elements, said conductive elements fixedly supporting the beam structure in position.

14. A sensor as in claim 13 further comprising a housing comprising a base, wherein the conductive elements each comprise respective first and second portions, said first portions extending adjacent the base, said second portions extending away from the base and engaging the beam structure therebetween to mount the beam structure in position in the housing.

15. A sensor as in claim 14 wherein the second portions comprise respective fingers which grip the beam structure therebetween.

* * * * *